Patented May 16, 1939

2,158,980

UNITED STATES PATENT OFFICE 2,158,980

METHOD OF LOCATING METALS AND MINERALS IN THE GROUND

Nils Brundin, Romford, England

No Drawing. Application August 23, 1937, Serial No. 160,554. In Sweden September 7, 1936

1 Claim. (Cl. 23—230)

This invention relates to methods of locating the presence of the enrichment of certain elements in the ground.

There is scarcely any known element which does not exist everywhere in some form or other. Most elements, however, occur under normal conditions in such low concentrations that, for technical and economic reasons, their exploration is out of the question. Nevertheless, places of somewhat rare occurrence, however, can be found where these elements are present in concentrations above the normal, so that their exploration is technically and economically possible. For locating such concentrations various methods have already been invented and patented. At present, geo-physical processes are almost exclusively employed in practical prospecting work. These processes, however, are rather complicated and require a good deal of time, labour and heavy instruments, and, moreover, the indications obtained thereby are often misleading and lead to fruitless efforts. The more this can be avoided— that is to say, the more reliable the indications obtained as a result of the prospecting work are—and the more quickly and cheaply it can be done, the more effective and profitable will the exploration be. The present invention provides a prospecting process, that is to say, a method of finding and locating metallic and like ores, which has considerable advantages in comparison with the prospecting processes employed hitherto, and can either replace the latter completely or can be used to supplement them.

The method according to the invention consists in general in systematically collecting from the area to be investigated samples of plant materials, taken either from living or dead plants, and, preferably after combustion of the material to expel any organic constituents, in subjecting the samples to spectrum-analysis to obtain comparative values for the average concentration of one or more desired elements in large volumes of ground at the places where the samples were taken. In view of the small quantities of sample material which are worked with, and considering the small percentage in which the elements sought are usually present in the sample material, practically no analytic process other than spectrum-analysis can come under consideration when determining the comparative percentages of the elements in the samples. From a practical point of view and as regards cost spectrum-analysis is also more suitable than any other method of analysis for the purpose of determining the percentages in question, since comparative values only need be obtained and these are arrived at without great difficulty and with necessary accuracy, for example, by examination of the characteristic spectral lines of the elements sought on photographs taken of the spectrum. The technique of spectrum-analysis is already highly developed and will amply suffice for the requirements of the prospecting process of the invention.

As already stated, it is not absolutely necessary, although it is highly advantageous or advisable, to take the samples of material from rooted or living trees or other plants. The object, in general, is to take the samples to be analysed, for obtaining information about the concentration of particular elements in the locality in question, instead of directly from the geological circulation, indirectly from the biological circulation of the elements. This biological circulation takes place not only through the living plants but also through any part which falls and rots on the ground, that is to say, the humus layer, and, in some cases therefore the samples may be taken therefrom. The essential difference between taking samples directly from the geological circulation and taking them indirectly from the biological circulation is that any local variations occurring in the geological circulation are smoothed out evenly in the biological circulation, so that, when samples from the latter are taken, very small samples will suffice, and will not be affected by local variations in the geological circulation; on the other hand, when samples are taken from the geological circulation false indications due to local variations can only be avoided by working with immense quantities of sample material, which is out of the question from a technical point of view and also as regards cost. The process according to the invention, in other words, makes use of a balancing process carried out naturally by the plants, which would otherwise have to be carried out artificially and would then necessitate a great deal of work and great expense. In the process of the invention, the plants provide easily procurable samples which indicate the average concentration of the elements within large volumes of ground, and it is only necessary to collect as much of these samples as is needed to be able to analyse them properly. These samples offer a further advantage in that the elements sought are often enriched in proportion to the average concentration of the elements in the volume of ground out of which the plant has obtained its nourishment, and thus the analysis of these elements is facilitated. In the parts of the plants from which the evaporation is greatest, that is to say, leaves and needles, an enrichment must apparently take place of the non-evaporated inorganic elements or compounds which the plant cannot utilize. Leaves and needles should therefore be preferably chosen as the sample material. In order to be able to compare analyses of ash from various trees, however, the analysed samples should be taken from trees of the same species and from the same parts of the trees. Moreover, the trees, from which the samples are taken, must be approximately of the same size, so that their roots extend downwards to approximately the same depth. The observance of these three conditions gives rise to no difficulty whatever in a forest.

In all cases where the region to be investigated is (1) covered with more or less continuous vegetation and (2) is situated above the maximum sea limit, the method can be successfully employed in practice. Even in other localities the process may be found to be feasible. Where the area to be investigated consists of land which was previously the bottom of the sea, the sea may have exercised a changing influence on the condition of the ground in one direction or another, so that it will be imperative to pay special attention to this when the process is carried into practice.

The possibility of proving the presence of an ore body by means of the process according to this invention depends to a certain extent on the degree in which the elements contained in the ore are enriched in proportion to their concentration in average types of rocks or ground. The higher the degree of enrichment, the better suited is the process, as it is more likely that its indications will be clear. The process is therefore especially suited for locating ores of gold, silver, lead, zinc and the like which possess a high degree of enrichment.

The prospecting method of the present invention can, of course, be supplemented by investigations by other methods. For example, it may be thought advantageous, after locating an ore body by the present process, to make use of electrical measurements in order to ascertain its extent in any direction in which the surface of the ground is not sufficiently accessible.

When carrying out the analysis by means of the spectrograph, it has been found that ordinary carbons, even if purified by the customary methods, for example by treatment with acids, are useless owing to the impurities still contained in them. In order to obtain carbons which are sufficiently pure, in accordance with a further feature of the invention, the carbons are heated up to a temperature of 2500–4000° C., preferably in an atmosphere of carbon tetrachloride or chlorine. The results of the analysis may suitably be plotted in the form of a curve and, where the presence of a particular metal which it is desired to locate, is indicated, further samples are then preferably taken in this area at closer intervals. These samples are then treated as before and a fresh curve can be drawn from which the location of the particular metal can be more accurately determined.

The invention will now be explained in reference to an actual test which was carried out in the small Blyberg mining field, situated three miles south of Ludvika and no longer worked, where at the end of the 18th and in the middle of the 19th century argentiferous galena was extracted. The direction in which the inland glaciers had moved here was practically from north to south, and for this reason the samples were taken along lines from east to west to the south of the ore body. The distance between the lines, 7 in number, was, at the start, 100 metres, but between the last three, 200 metres. Along each line samples were taken at every 20 metres, the total number being 20, the length of the lines amounting to 380 metres. The samples collected consisted of growing pine-tree twigs. After the twigs had dried, the needles were reduced to ashes in china crucibles held over Bunsen burners. From the ashes the percentages of lead was then determined by means of spectrum-analysis according to the method of Mannkopf and Peters, by use of carbon arc cathode layer.

The results obtained from this test afforded sufficient proof of the practicability of the prospecting process of the invention. No sudden discontinuity in the lead percentage of the trees due to the local conditions was found on the other hand, all variations were quite continuous and exactly as one would have expected, if they represented the variations in the average lead percentages of large volumes of moraine within a block tail region connected with a lead ore body. It may be pointed out in particular that, even at a distance of 800 metres from the southern end, the eastern limit of the block tail region could clearly be determined. The western limit could not be fixed for the reason that the lines taken for the sampling fell short of it. When the comparative values of the lead concentration obtained were graphically set out on a map of the region investigated, a clear picture in accordance with actual facts was given of the position of the ore body which had given rise to the block tail region.

The process of the invention has a number of important advantages, of which the following, in particular, may be mentioned:

(1) For the field work, which solely consists in collecting twigs from trees, no apparatus is required.

(2) All field work can be carried out by unskilled workmen.

(3) As the quantitative analyses can be made spectrographically with sufficient accuracy, they can be completed very quickly. A man should without great difficulty be able to complete the determination of Pb, Zn, and Cu percentages of some thirty samples a day. As, for example Au requires enrichment in the samples before the analyses, the rapidity of determining such an element is less. Nevertheless two men should be able to have time for quantitative analyses of the elements Au, Ag, Pb, Zn and Cu of some twenty samples a day.

(4) The process is particularly cheap. Apart from the capital outlay on the apparatus and the wages, the cost per analysis is extremely low.

(5) As soon as an ore has been proved to exist, the metals present can be identified. Moreover, any false indications, which are commonly obtained with other prospecting processes are avoided. Thus, for example, Västerbotten slate containing graphite, when investigated electrically, gave the same indications as metallic ores, and this has, indeed been the cause of many fruitless drilling holes.

(6) The process can be used when an ore body is known to exist, in order to find its mother association.

(7) The process can be used when indications have been obtained in another way to form an idea of the mineral association giving rise to the indication in question.

(8) The process can be employed with advantage for surveying work in less known areas. One can depend on all deposits of Au, Ag, Zn, and Pb, and any large deposit of Cu being traced, provided samples are taken at 50 metre intervals along lines at a distance of 500 metres from each other. An area of one square kilometre can be worked in two days by 2 men. Electric surveying requires seven days for the same area with many more workmen.

I claim:

A method of detecting the presence and location of metals and ores in the ground, which comprises the steps of taking samples of vegetable material of the same species at substantially regular intervals along lines distributed over the area to be investigated, ashing the samples, subjecting the ash to spectrographic analysis, and plotting the results obtained in the form of a graph or map of the area investigated so as to exhibit areas of greatest concentration of the metal.

NILS BRUNDIN.